US009715746B2

(12) United States Patent
Yoo et al.

(10) Patent No.: US 9,715,746 B2
(45) Date of Patent: Jul. 25, 2017

(54) CURVE RENDERING METHOD AND APPARATUS

(71) Applicant: Samsung Electronics Co., Ltd., Suwon-si (KR)

(72) Inventors: Jeongjoon Yoo, Hwaseong-si (KR); Seokyoon Jung, Seoul (KR); Soojung Ryu, Hwaseong-si (KR); Donghoon Yoo, Seongnam-si (KR); Yoonseo Choi, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 204 days.

(21) Appl. No.: 14/518,501

(22) Filed: Oct. 20, 2014

(65) Prior Publication Data

US 2015/0228094 A1 Aug. 13, 2015

(30) Foreign Application Priority Data

Feb. 13, 2014 (KR) .................. 10-2014-0016933

(51) Int. Cl.
*G06T 11/20* (2006.01)
*G06T 11/60* (2006.01)
(52) U.S. Cl.
CPC ............ *G06T 11/203* (2013.01); *G06T 11/20* (2013.01); *G06T 11/60* (2013.01)
(58) Field of Classification Search
None
See application file for complete search history.

(56) References Cited

U.S. PATENT DOCUMENTS

| 5,125,073 | A | 6/1992 | Lien et al. |
| 5,179,647 | A | 1/1993 | Chang |
| 5,287,441 | A | 2/1994 | Nakamura |
| 5,604,852 | A | 2/1997 | Watters et al. |
| 6,707,452 | B1 | 3/2004 | Veach |
| 2006/0256115 | A1* | 11/2006 | Cao .................. G06T 11/20 345/442 |

(Continued)

FOREIGN PATENT DOCUMENTS

| JP | 3344597 B2 | 8/2002 |
| KR | 10-1240815 B1 | 3/2013 |

OTHER PUBLICATIONS

Ari Rappoport , "Rendering Curves and Surfaces with Hybrid Subdivision and Forward Differencing", ACM Transactions on Graphics (TOG) TOG Homepage archive , vol. 10 Issue 4, Oct. 1991 , pp. 323-341 , ACM New York, NY, USA.*

(Continued)

*Primary Examiner* — Tize Ma
(74) *Attorney, Agent, or Firm* — Harness, Dickey & Pierce, P.L.C.

(57) ABSTRACT

A curve rendering method includes calculating a step size based on a length of a straight line connecting a start point and an end point among control points of a curve to be rendered, and calculating initial values of a forward differencing algorithm (FDA) based on the calculated step size and coefficient values of an equation of the curve that is determined based on the control points. The method further includes generating an FDA table based on the initial values, and calculating a coordinate value of a pixel based on the FDA table.

22 Claims, 14 Drawing Sheets

(56) References Cited

U.S. PATENT DOCUMENTS

2011/0285722 A1* 11/2011 Kilgard ................ G06T 11/203
345/442

OTHER PUBLICATIONS

Moreton, Henry. "Watertight Tessellation Using Forward Differencing." Proceedings of the ACM SIGGRAPH/EUROGRAPHICS workshop on Graphics hardware. ACM (2001): 25-32.
Chang, Yun-Nan. "A fast spline curve rendering accelerator architecture." IEEE Transactions on Circuits and Systems II: Express Briefs vol. 56, No. 11 (2009): 870-874.

* cited by examiner

−PRIOR ART−

−PRIOR ART−

FIG. 3A

| t | x(t) | FD | FDD | FDDD | ROUND(x) |
|---|---|---|---|---|---|
| 0 | 0 | 1.19984 | -0.00096 | -0.00096 | 0 |
| 0.02 | 1.19984 | 1.19888 | -0.00192 | -0.00096 | 1 |
| 0.04 | 2.39872 | 1.19696 | -0.00288 | -0.00096 | 2 |
| 0.06 | 3.59568 | 1.19408 | -0.00384 | -0.00096 | 4 |
| 0.08 | 4.78976 | 1.19024 | -0.0048 | -0.00096 | 5 |
| 0.1 | 5.98 | 1.18544 | -0.00576 | -0.00096 | 6 |
| 0.12 | 7.16544 | 1.17968 | -0.00672 | -0.00096 | 7 |
| 0.14 | 8.34512 | 1.17296 | -0.00768 | -0.00096 | 8 |
| 0.16 | 9.51808 | 1.16528 | -0.00864 | -0.00096 | 10 |

FIG. 3B

| t | y(t) | FD | FDD | FDDD | ROUND(y) |
|---|---|---|---|---|---|
| 0 | 0 | 0.02384 | 0.04704 | -0.00096 | 0 |
| 0.02 | 0.02384 | 0.07088 | 0.04608 | -0.00096 | 0 |
| 0.04 | 0.09472 | 0.11696 | 0.04512 | -0.00096 | 0 |
| 0.06 | 0.21168 | 0.16208 | 0.04416 | -0.00096 | 0 |
| 0.08 | 0.37376 | 0.20624 | 0.0432 | -0.00096 | 0 |
| 0.1 | 0.58 | 0.24944 | 0.04224 | -0.00096 | 1 |
| 0.12 | 0.82944 | 0.29168 | 0.04128 | -0.00096 | 1 |
| 0.14 | 1.12112 | 0.33296 | 0.04032 | -0.00096 | 1 |
| 0.16 | 1.45408 | 0.37328 | 0.03936 | -0.00096 | 1 |

CURVE RENDERING METHOD AND APPARATUS

CROSS-REFERENCE TO RELATED APPLICATIONS

This application claims the benefit of Korean Patent Application No. 10-2014-0016933, filed on Feb. 13, 2014, in the Korean Intellectual Property Office, the entire disclosure of which is incorporated herein by reference for all purposes.

BACKGROUND

1. Field

The following description relates to curve rendering methods and apparatuses.

2. Description of Related Art

In curve rendering, a step size is an important factor for determining the rendering performance or curve quality. When the step size is excessively small, the rendering performance may be degraded due to redundant rendering, and when the step size is excessively large, cracks may be generated.

FIGS. 1A and 1B are diagrams illustrating redundant rendering and cracks in pixels due to a step size in a forward differencing algorithm (FDA), which is one of the curve rendering algorithms. As can be seen from FIGS. 1A and 1B, when the step size is set to be excessively small, redundant rendering occurs, and when the step size is set to be excessively large, cracks are generated, thereby degrading the quality of a curve shape. Referring to FIG. 1A, when the step size is equal to 0.01, redundant rendering occurs in pixels. A coordinate value of a next point is calculated by a time t by the step size.

Referring to FIG. 1A, small black points represent (x, y) coordinates that are calculated according to the change of time t, and large hatched points represent pixel coordinates that are close to the respective small black points on the actual screen. That is, a small black point at t=0.01 is rendered by being converted into pixel coordinates (1, 0) on the actual screen. A small black point at t=0.02 is rendered by being converted into close pixel coordinates (1, 0) on the actual screen. As such, when t=0.01 and t=0.02, redundant rendering occurs at the same coordinates. This increases the number of memory input/output (I/O), thus degrading the whole performance of curve rendering. Similarly, redundant rendering occurs when t=0.03 and t=0.04, t=0.06 and t=0.07, t=0.08 and t=0.09, and t=0.11 and t=0.12.

Referring to FIG. 1B, the step size was modified to 0.02 so as to prevent redundant rendering. In this case, since no redundant rendering occurs, the rendering performance is improved. However, since the pixel coordinates between t=0.04 and t=0.06 are not rendered, a curve is broken, that is, a crack is generated, which degrades the quality of curve rendering.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a curve rendering method including calculating a step size based on a length of a straight line connecting a start point and an end point among control points of a curve to be rendered, calculating initial values of a forward differencing algorithm (FDA) based on the calculated step size and coefficient values of an equation of the curve that is determined based on the control points, generating an FDA table based on the initial values, and calculating a coordinate value of a pixel based on the FDA table.

The curve rendering method may further include determining whether a crack has been generated by comparing the calculated coordinate value of the pixel with a coordinate value of an immediately previous pixel, and adding another pixel between the pixel and the immediately previous pixel in response to the crack being determined to have been generated.

The determining of whether the crack has been generated may include determining that the crack has been generated in response to a difference between round function values for coordinate component values of two coordinate values corresponding to two adjacent pixels being 2.

The determining of whether the crack has been generated may include determining that the crack has been generated in response to a slope of a straight line connecting two coordinate values corresponding to two adjacent pixels being less than 1, and a difference between round function values for x-coordinate component values of the two coordinate values being 2, and determining that the crack has been generated in response to the slope of the straight line connecting the two coordinate values being greater than or equal to 1, and a difference between round function values for y-coordinate component values of the two coordinate values being 2.

The adding may include filling the crack based on a function of drawing a line connecting two pixels adjacent to the crack, a function of marking a dot on a pixel between the two adjacent pixels, or a function of drawing a rectangle on a pixel between the two adjacent pixels.

The calculating of the step size may include calculating a number of steps based on the length of the straight line, and calculating the step size to be a reciprocal of the number of the steps.

The calculating of the initial values may include calculating the coefficient values based on the control points.

The curve rendering method may further include generating a monotonic curve to be the curve to be rendered.

The generating of the monotonic curve may include in response to the curve having four or more control points, converting the curve into a curve having three control points, determining whether a peak point exists in the curve having the three control points, and decomposing the curve having the three control points into monotonic curves in response to the peak point being determined to exist in the curve having the three control points.

The control points of the curve may be $P_0(x_0, y_0)$, $P_1(x_1, y_1)$, and $P_2(x_2, y_2)$. The determining of whether the peak point exists in the curve having the three control points may include in response to the curve having the three control points being directed in an upward or downward direction, calculating a t value at coordinates of the peak point based on the following equation $t=T=(y_0-y_1)/(y_0-y_1-y_1+y_2)$, and in response to the curve having the three control points being directed in a left or right direction, calculating the t value at the coordinates of the peak point based on the following equation $t=T=(x_0-x_1)/(x_0-x_1-x_1+x_2)$. The decomposing of the curve having the three control points may include decomposing the curve having the three control points into two curves at a t position in response to the calculated t value not being in a range of about 0 to about 1.

A non-transitory computer-readable storage medium may store a program including instructions to cause a computer to perform the curve rendering method.

In another general aspect, there is provided a curve rendering apparatus including a step calculating unit configured to calculate a step size based on a length of a straight line connecting a start point and an end point among control points of a curve to be rendered, and a coordinate value calculating unit configured to calculate initial values of a forward differencing algorithm (FDA) based on the calculated step size and coefficient values of an equation of the curve that is determined based on the control points, generate an FDA table based on the initial values, and calculate a coordinate value of a pixel based on the FDA table.

The curve rendering apparatus may further include a crack checking unit configured to determine whether a crack has been generated by comparing the calculated coordinate value of the pixel with a coordinate value of an immediately previous pixel, and a crack removing unit configured to add another pixel between the pixel and the immediately previous pixel in response to the crack being determined to have been generated.

The crack checking unit may be configured to determine that the crack has been generated in response to a difference between round function values for coordinate component values of two coordinate values corresponding to two adjacent pixels being 2.

The crack checking unit may be configured to determine that the crack has been generated in response to a slope of a straight line connecting two coordinate values corresponding to two adjacent pixels being less than 1, and a difference between round function values for x-coordinate component values of the two coordinate values being 2, and determine that the crack has been generated in response to the slope of the straight line connecting the two coordinate values being greater than or equal to 1, and a difference between round function values for y-coordinate component values of the two coordinate values being 2.

The crack removing unit may be configured to fill the crack based on a function of drawing a line connecting two pixels adjacent to the crack, a function of marking a dot on a pixel between the two adjacent pixels, or a function of drawing a rectangle on a pixel between the two adjacent pixels.

The step calculating unit may include a step number calculating unit configured to calculate a number of steps based on the length of the straight line, and a step size calculating unit configured to calculate the step size to be a reciprocal of the number of the steps.

The coordinate value calculating unit may include an initial value calculating unit configured to calculate the coefficient values based on the control points.

The curve rendering apparatus may further include a curve monotonizing unit configured to generate a monotonic curve to be the curve.

The curve monotonizing unit may include a control point converting unit configured to, in response to the curve having four or more control points, convert the curve into a curve having three control points, a peak point checking unit configured to determine whether a peak point exists in the curve having the three control points, and a curve decomposing unit configured to decompose the curve having three control points into monotonic curves in response to the peak point being determined to exist in the curve having the three control points.

The control points of the curve may be $P_0(x_0, y_0)$, $P_1(x_1, y_1)$, and $P_2(x_2, y_2)$. In response to the curve having the three control points being directed in an upward or downward direction, the peak point checking unit may be configured to calculate a t value at coordinates of the peak point based on the following equation $t=T=(y_0-y_1)/(y_0-y_1-y_1+y_2)$. In response to the curve having the three control points being directed in a left or right direction, the peak point checking unit may be configured to calculate the t value at the coordinates of the peak point based on the following equation $t=T=(x_0-x_1)/(x_0-x_1-x_1+x_2)$. The curve decomposing unit may be configured to decompose the curve having the three control points into two curves at a t position in response to the calculated t value not being in a range of about 0 to about 1.

In still another general aspect, there is provided a curve rendering apparatus including a step calculating unit configured to calculate a step size based on a length of a straight line connecting a start point and an end point among control points of a curve to be rendered, and a coordinate value calculating unit configured to calculate a coordinate value of a pixel based on the calculated step size. The apparatus further includes a crack checking unit configured to determine whether a crack has been generated based on the calculated coordinate value of the pixel.

The coordinate value calculating unit may include an initial value calculating unit configured to calculate coefficient values of an equation of the curve based on the control points, and calculate initial values of a forward differencing algorithm (FDA) based on the calculated step size and the calculated coefficient values, a table generating unit configured to generate an FDA table based on the initial values, and a pixel coordinate value calculating unit configured to calculate the coordinate value of the pixel based on the FDA table by adding the initial values.

The crack checking unit may be configured to determine that the crack has been generated in response to a difference between round function values of the calculated coordinate value of the pixel and a coordinate value of an immediately previous pixel being 2.

Other features and aspects will be apparent from the following detailed description, the drawings, and the claims.

BRIEF DESCRIPTION OF THE DRAWINGS

FIGS. 3A and 3B are diagrams illustrating an example of an FDA table that describe a method of calculating (x, y) coordinates of a next point by using an FDA when a step size is 0.02.

Figure 1A:
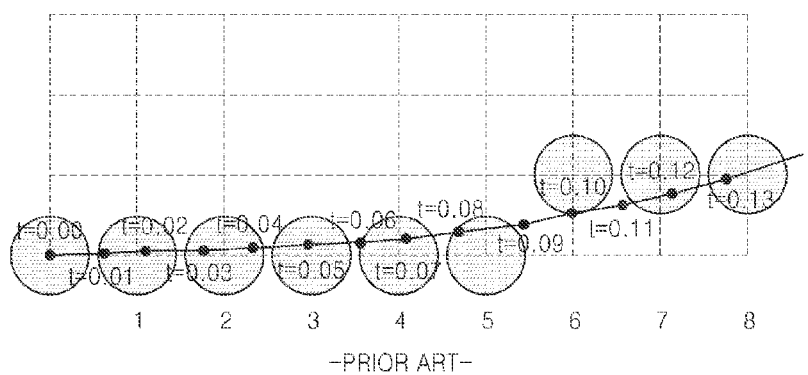
FIGS. 1A and 1B are diagrams illustrating redundant rendering and cracks in pixels according to a step size in a forward differencing algorithm (FDA).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

A parametric curve may be used to calculate (x, y) coordinates of a point on a curve by using a time t (step size) as a parameter. That is, the parametric curve may be defined as follows.

$$x(t)=A_x t^3+B_x t^2+C_x t+D_x$$

$$y(t)=A_y t^3+B_y t^2+C_y t+D_y$$

$$(0 \leq t \leq 1)$$

$$A=-P_0+3P_1-3P_2+P_3$$

$$B=3P_0-6P_1+3P_2$$

$$C=-3P_0+3P_1$$

$$D=P_0 \quad \text{[Equation 1]}$$

where $P_0$, $P_1$, $P_2$, and $P_3$ are control points.

Generally, an adaptive forward differencing algorithm (AFDA) is used for preventing redundant rendering and cracks on pixels. In order to determine a step size, the AFDA utilizes a recursive sub-division method that has been used for curve decomposition. That is, a curve is repetitively divided by using De Casteljau's algorithm until a difference between a current point and a next point becomes ½ of a pixel step to one pixel step. The number of divisions to make the difference become ½ of a pixel step to one pixel step is defined as the number of steps (hereinafter, also referred to as NumStep), and 1/NumStep is determined as a step size (hereinafter, also referred to as StepSize).

In examples described herein, the determination of the step size is performed by using the coordinates of a start point and an end point of a monotonic curve. That is, the number of steps may be easily determined by using the fact that a length of a straight line connecting the start point and the end point of the curve is less than a length of the curve, and twice the length of the straight line is greater than the length of the curve.

Regarding a crack processing method, the AFDA increases the step size twice when redundant rendering occurs, and reduces the step size by half when a crack is detected. With respect to the fluctuating step size, initial values of the FDA are re-calculated, and the coordinates of a next point are calculated.

In the examples described herein, the step size is ensured enough to prevent the occurrence of the redundant rendering. Even when a crack is generated, the coordinates of the next point are calculated without changing the step size. A crack removing block or function, which manages crack processing in parallel, separately processes the crack without stopping the rendering. In the examples, since the step size does not fluctuate, overhead is eliminated. That is, it is unnecessary to re-calculate the FDA initial values ($x_0$, $FD_{x0}$, $FDD_{x0}$, $FDDD_{x0}$, $y_0$, $FD_{y0}$, $FDD_{y0}$, $FDDD_{y0}$) which occur at the time of changing the step size.

Figure 2:
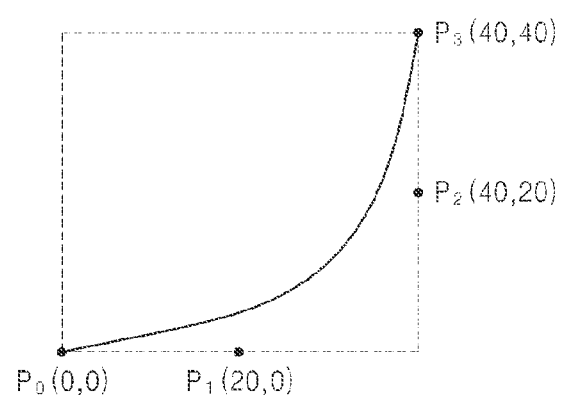
FIG. 2 is a diagram illustrating an example of a cubic Bezier curve.

FIG. 2 is a diagram illustrating an example of a cubic Bezier curve. A method of rendering a curve having control points $P_0(0,0)$, $P_1(20,0)$, $P_2(40,20)$, and $P_3(40,40)$ by using an FDA will be described below with reference to FIG. 2. The curve of FIG. 2 may be represented by a parametric curve, as expressed in Equation 1 below.

$$x(t)=A_x t^3+B_x t^2+C_x t+D_x$$

$$y(t)=A_y t^3+B_y t^2+C_y t+D_y$$

$$(0 \leq t \leq 1)$$

$$A=-P_0+3P_1-3P_2+P_3$$

$$B=3P_0-6P_1+3P_2$$

$$C=-3P_0+3P_1$$

$$D=P_0 \quad \text{[Equation 1]}$$

where $P_0$, $P_1$, $P_2$, and $P_3$ are control points for the curve.

FDA initial values (t=0) are calculated as expressed in Equation 2.

$$P(0)=D$$

$$FD=A\Delta^3+B\Delta^2+C\Delta$$

$$FDD=6A\Delta^3+2B\Delta^2$$

$$FDDD = 6A\Delta^3 \quad \text{[Equation 2]}$$

where $\Delta$ is a StepSize $\Delta t$.

In addition, after t=0.01, the (x, y) coordinates of P may be calculated by using Equation 3 below.

$$P_n = P_{n-1} + FD_{n-1}$$

$$FD_{n-1} = FD_{n-2} + FDD_{n-2}$$

$$FDD_{n-2} = FDD_{n-3} + FDDD_{n-3} \quad \text{[Equation 3]}$$

Using Equation 3 above, an FDA table for $\Delta$=0.02 may be generated as illustrated in FIG. 3. FIGS. 3A and 3B are diagrams illustrating an example of the FDA table that describes a method of calculating (x, y) coordinates of a next point by using an FDA when a step size is 0.02.

The coordinates on the curve may easily be calculated from the FDA table. For example, when t=0, the coordinates on the curve are (0, 0). When t=0.02, that is, when time t is increased by the step size of 0.02, the coordinates on the curve are (1.19984, 0.002384). When t=0.04, the coordinates on the curve are (2.39872, 0.09472). For example, the coordinates on the curve may be easily calculated by using $x(0.02) = x(0) + FD_{x0}$. As compared with Equation 1 in which a large number of multiplication operations are performed, Equation 3 is more effective in terms of computational amount because only addition operations are performed on all values other than initial values. Hence, the method using Equation 3 is widely used for curve rendering.

Figure 1B:
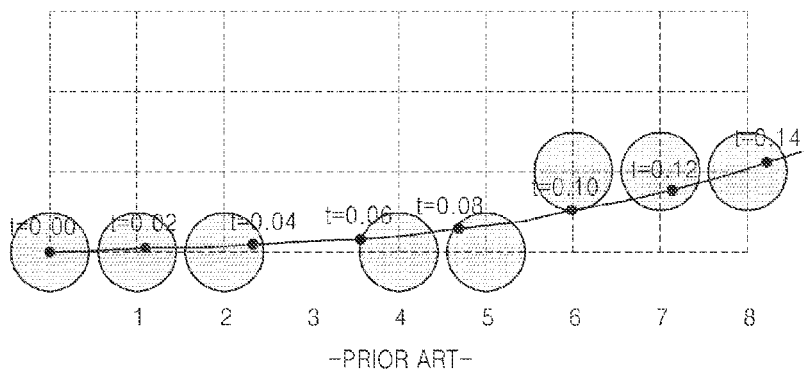

However, in such FDA methods, redundant rendering or cracks occur as described with reference to FIG. 1. In order to solve this problem, an AFDA has been proposed. That is, when the following condition 1 is satisfied, a step size is dynamically changed.

(Condition 1)

a) A step size (t value increment) is increased by two times when pixel positions of the newly calculated coordinates $(x_t, y_t)$ and the previous coordinates $(x_{t-1}, y_{t-1})$ are increased by less than ½ of a pixel.

b) A step size (t value increment) is decreased by half when pixel positions of the newly calculated coordinates $(x_t, y_t)$ and the previous coordinates $(x_{t-1}, y_{t-1})$ are increased by more than one pixel.

Like b) of the condition 1, when the (x, y) coordinates have difference from the existing coordinates by more than one pixel, it is considered that a crack has been generated. Thus, a step size is reduced by half, and an FDA is executed again from the existing $(x_{t-1}, y_{t-1})$ coordinates based on the changed step size. That is, an initial value starting from t−1 is calculated, and the coordinates of a next point are calculated by the above-described FDA.

Since a crack is removed in such a manner and the step size is reduced, redundant rendering may occur. That is, the same pixel may be rendered twice or more times. If such redundant rendering occurs in pixels, the step size will be increased again by two times.

In the general AFDA, when the redundant rendering or cracks occur, the step size is frequently changed. If the step size is changed, overhead occurs, that is, the FDA initial value is necessary to be re-calculated.

Figure 4:
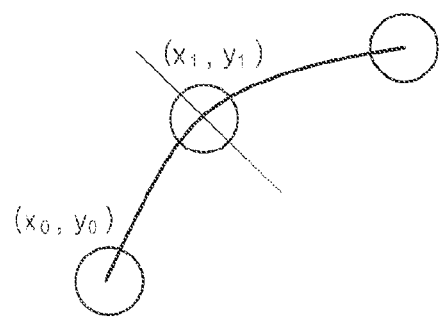
FIG. 4 is a diagram illustrating an example of a process of sub-dividing a single curve into two sub-curves by curve decomposition.

In the AFDA method, the initial value of the step size is calculated by using De Casteljau's algorithm, which is a curve decomposition algorithm. FIG. 4 is a diagram illustrating an example of a process of sub-dividing a single curve into two sub-curves by curve decomposition. Referring to FIG. 4, a current curve is sub-divided into a left curve LC and a right curve RC (in this case, number of steps=2 and step size=0.5), and it is determined whether a distance between a start point (t=0) of the left curve and a midpoint (t=0.5) of the left curve, that is, a distance between $(x_0, y_0)$ and $(x_1, y_1)$, satisfies condition 2 below.

(Condition 2)

a) It is determined whether the distance between (x0, y0) and (x1, y1) satisfies a condition of a ½ pixel to one pixel step, where $(x_0, y_0)$ is a start point of a curve, and $(x_1, y_1)$ are the coordinates (x, y) of a next point when t=StepSize.

When the condition 2 is satisfied and the distance between $(x_0, y_0)$ and $(x_1, y_1)$ is greater than one pixel step, the left curve is sub-divided again into a left left curve LLC and a right left curve RLC. The, it is determined whether the left left curve LLC satisfies the condition 2. The process of sub-dividing the leftmost curve is repeated until the condition 2 is satisfied. When the condition 2 is satisfied, the curve sub-division is stopped and the NumStep value becomes a "number of calling the curve sub-division+1"

Since StepSize*NumStep=1", the step size may be calculated as StepSize=1/NumStep. As expressed in Equation 1, the curve is an xy function having time t as a parameter (where 0<t<1).

Figure 5:
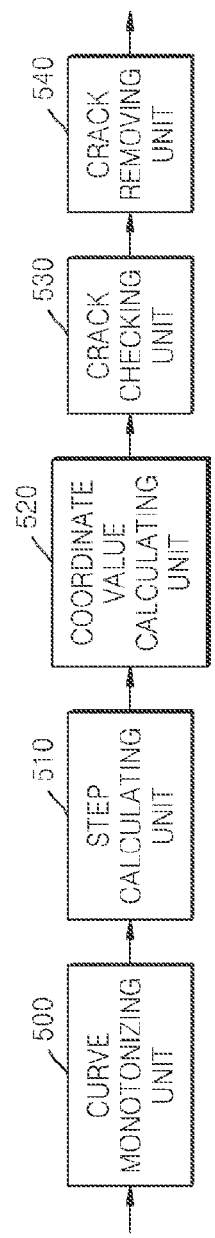
FIG. 5 is a block diagram illustrating an example of a curve rendering apparatus.
Figure 6:
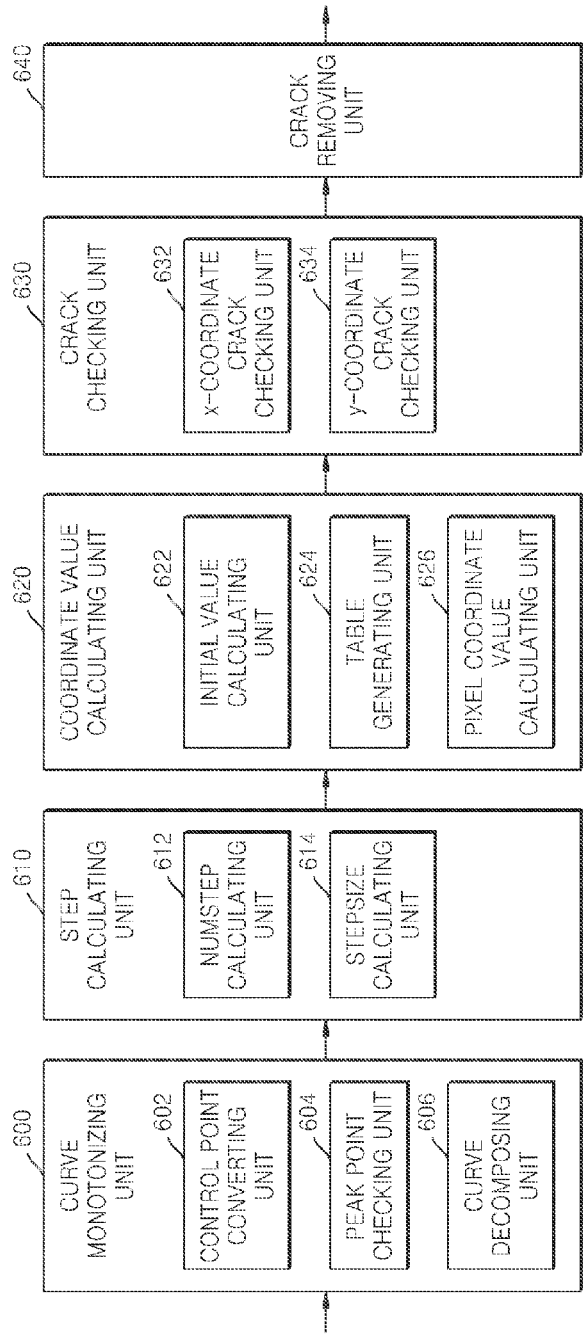
FIG. 6 is a block diagram illustrating another example of a curve rendering apparatus.

FIG. 5 is a block diagram illustrating an example of a curve rendering apparatus. FIG. 6 is a block diagram illustrating another example of a curve rendering apparatus.

Referring to FIGS. 5 and 6, the curve rendering apparatus includes a step calculating unit 510 (610). The step calculating unit 510 (610) calculates a NumStep Value and a StepSize value by using a length of a straight line connecting a start point and an end point, among control points for curve rendering.

The step calculating unit 510 (610) may include a NumStep calculating unit 612 and a StepSize calculating unit 614. The NumStep calculating unit 612 calculates the NumStep value by using the length of the straight line connecting start point coordinates and end point coordinates of the control points. The StepSize calculating unit 614 determines a reciprocal of the NumStep value as the StepSize value.

The step calculating unit 510 (610) will be described below in more detail. In order to render a parametric curve, it is determined how much the value of the parameter t (time) is to be increased in Equation 1. For example, referring to FIGS. 3A and 3B, x and y values are calculated while increasing the value of the parameter t by 0.02. Since the value "0.02" is the StepSize value and the time t is 0≤t≤1, the NumStep value may be derived as 1/0.02 (=50).

Figure 8:
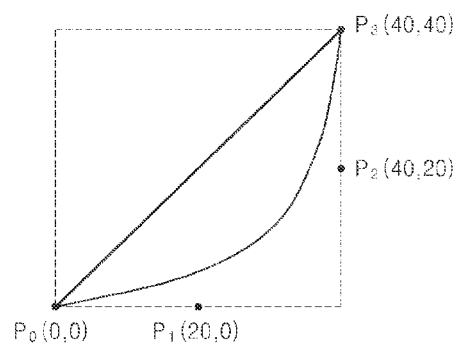
FIG. 8 is a diagram illustrating an example of a curve having control points.

A method of determining the NumStep value and the StepSize value will be described below with reference to a curve illustrated in FIG. 8. The determination of the NumStep value is performed as follows. FIG. 8 is a diagram illustrating an example of a curve having control points $P_0$, $P_1$, $P_2$, and $P_3$. $P_0$ and $P_3$ are a start control point and an end control point of the curve, respectively. In FIG. 8, a straight line L connects the control points $P_0$ and $P_3$. A number of pixels to be rendered on the curve determines a NumStep value. When the NumStep value is determined, a StepSize (t value) for each stage is determined.

A number of pixels existing on the curve is larger than a number of pixels on the straight line L. By using this fact, the NumStep value is determined as follows. A minimum value of the NumStep value is an integer representing the number of pixels existing on the straight line L. Assuming that coordinates on the straight line L have a 1:1 correspondence with pixel coordinates, the number of pixels existing on the straight line L is equal to a length of the straight line L. Therefore, the NumStep value for rendering the curve may be calculated as follows.

$$NumStep = \sqrt{|40-0|^2 + |40-0|^2} = 56.5685424949238$$

Since the NumStep value is an integer, round-down may be performed to calculate the NumStep value as 56. In order to simplify the StepSize value, round-up or round-down may be performed, or the NumStep value may be adjusted in a range satisfying condition 3. That is, by setting the NumStep value to 50, the StepSize value may be simplified.

When the NumStep value is determined, the StepSize value is calculated as follows. If the NumStep value is assumed to be 50, NumStep*StepSize=1. Therefore, the StepSize value may be calculated as follows.

StepSize1/NumStep=1/50(when NumStep is rounded down)=0.02

Figure 14:
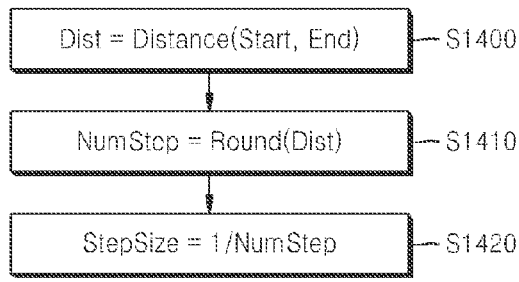
FIG. 14 is a flowchart illustrating an example of a process of determining a NumStep value and a StepSize value.

This process is illustrated in FIG. 14. FIG. 14 is a flowchart illustrating an example of a process of determining a NumStep value and a StepSize value. Referring to FIG. 14, in operation S1400, a length (Dist) of a straight line connecting start point coordinates and end point coordinates of control points is determined. The length (Dist) of the straight line is calculated by a Distance(Start, End) function of calculating a length between a start point (Start) and an end point (End).

In operation S1410, the NumStep value is determined to be a result of a round function for the length (Dist) of the straight line. In operation S1420, the StepSize value is determined by taking a reciprocal of the NumStep value.

Referring again to FIGS. 5 and 6, the curve rendering apparatus further includes a coordinate value calculating unit 520 (620). The coordinate value calculating unit 520 (620) calculates FDA initial values by using the calculated StepSize value and coefficient values of a curve equation that are determined when the control points are input. Then, the coordinate value calculating unit 520 (620) generates an FDA table by using the initial values. In detail, the coordinate value calculating unit 520 (620) calculates a coordinate value of a pixel by an operation of adding the initial values, and calculates next coordinate values of pixels based on the FDA table including the calculated coordinate value of the pixel.

The coordinate value calculating unit 520 (620) may include an initial value calculating unit 622, a table generating unit 624, and a pixel coordinate value calculating unit 626. The initial value calculating unit 622 calculates the coefficient values of the curve equation, like Equation 1, by using the control points, and calculates the FDA initial values by using the coefficient values and the StepSize value. The table generating unit 624 generates the FDA table by using the initial values. The pixel coordinate value calculating unit 626 calculates the coordinate value of the pixel, which is to be rendered, by an operation of adding the initial values, and calculates the next coordinate values of the pixels based on the FDA table including the calculated coordinate value of the pixel.

The coordinate value calculating unit 520 (620) will be described below in more detail. When the StepSize value is determined, the FDA initial values $X_0$, $FD_{x0}$, $FDD_{x0}$, $FDDD_{x0}$, $Y_0$, $FD_{y0}$, $FDD_{y0}$, and $FDDD_{y0}$ are generated by using Equations 1 and 2, as illustrated in FIGS. 3A and 3B. That is, Δ of Equation 2 represents the StepSize value, and the initial values of the FDA table (when t=0) may be calculated by using Δ=0.02, as illustrated in FIGS. 3A and 3B. With respect to points of time, except for t=0, (x, y) coordinates of a next point may be calculated by using Equation 3. The result may also be confirmed in FIGS. 3A and 3B. The above procedure is performed on each of the x value and the y value. The respective results may be confirmed in FIGS. 3A and 3B.

Referring again to FIGS. 5 and 6, the curve rendering apparatus further includes a crack checking unit 530 (630). When the coordinate values of the pixels are calculated, the crack checking unit 530 (630) checks for a generation of cracks by comparing each of the coordinate values of the pixels with a respective coordinate value of an immediately previous pixel. When a difference between round function values for coordinate component values of two coordinates corresponding to two adjacent pixels is 2, the crack checking unit 530 (630) determines that cracks have been generated.

When using the (x, y) coordinates, the crack checking unit 530 (630) may include an x-coordinate crack checking unit 632 and a y-coordinate crack checking unit 634. If a slope of a straight line connecting two adjacent coordinates on a curve is less than 1, the x-coordinate crack checking unit 632 determines that cracks have been generated when a difference between round function values for x-coordinate component values of the two coordinates is 2. If the slope of the straight line connecting two adjacent coordinates on the curve is greater than or equal to 1, the y-coordinate crack checking unit 634 determines that cracks have been generated when a difference between round function values for y-coordinate component values of the two coordinates is 2.

Figure 10:
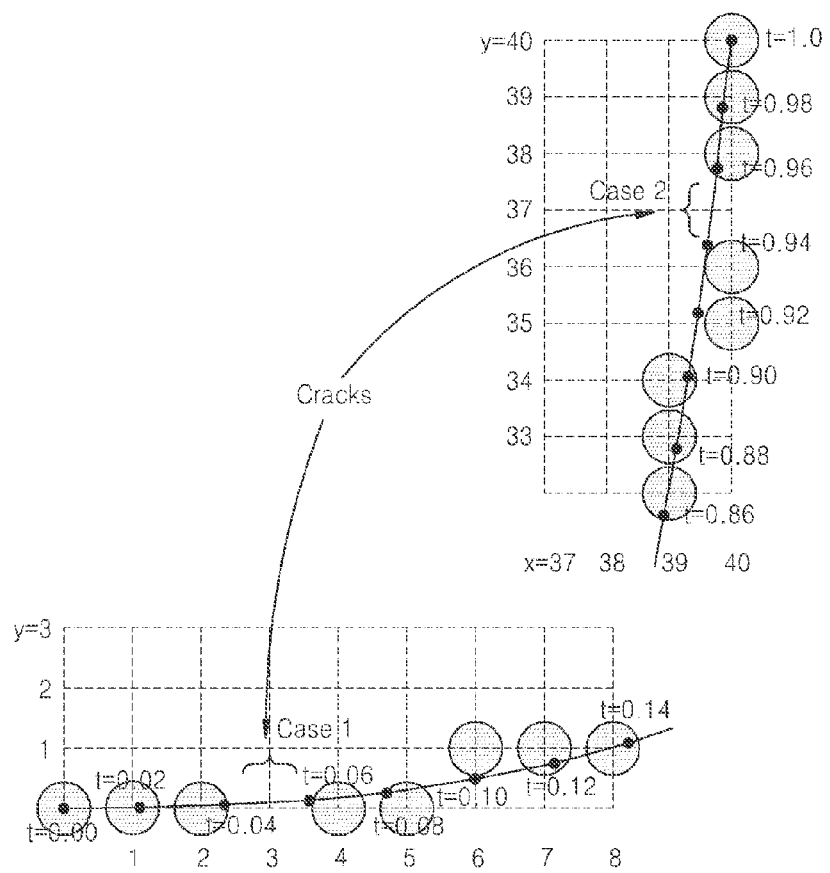
FIG. 10 is a diagram illustrating an example of a part of a result obtained when a point on a curve is rendered to a pixel by the FDA table of FIG. 3, and an example of cracks existing on the same line.

The crack checking unit 530 (630) will be described below in more detail. The crack checking unit 530 (630) checks whether a crack (a discontinuous pixel) is generated between a previous point and a current point on the curve. FIG. 10 is a diagram illustrating an example of a part of a result obtained when a point on a curve is rendered into a pixel by using the FDA table of FIG. 3, and an example of a crack existing on the same line. That is, an empty pixel exists between rendered pixel coordinates (2, 0) and (4, 0). In addition, an empty pixel exists between pixel coordinates (40, 36) and (40, 38). A crack is determined by the following method.

if $FD_y/FD_x < 1$ (Case 1 of FIG. 10), if $(|\text{Round}(X_t) - \text{Round}(X_{t-1})| > 1)$ return CRACK;

if $FD_y/FD_x \geq 1$ (Case 2 of FIG. 10)

if $(|\text{Round}(Y_t) - \text{Round}(Y_{t-1})| > 1)$ return CRACK   [Equation 6]

When Equation 6 is satisfied, it can be seen that cracks have been generated.

Figure 15:
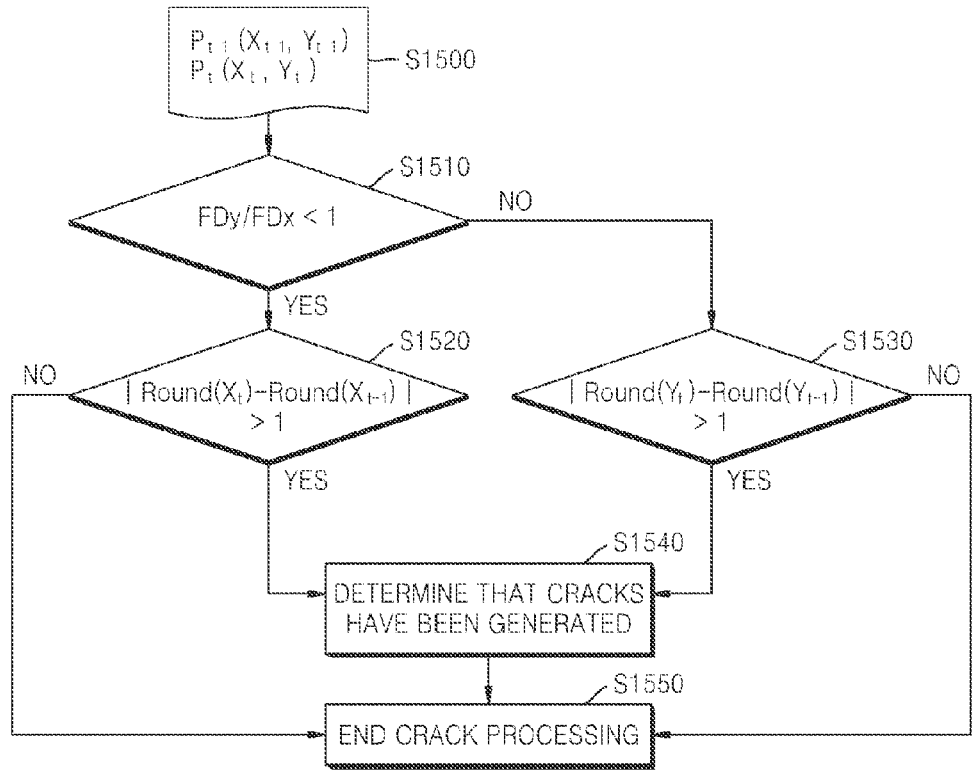
FIG. 15 is a flowchart illustrating an example of an operation of a crack checking unit.

FIG. 15 is a flowchart illustrating an example of an operation of the crack checking unit 530 (630). Referring to FIG. 15, in operation S1500, two adjacent coordinates $P_{t-1}(X_{t-1}, Y_{t-1})$ and $P_t(X_t, Y_t)$ on a curve are input.

In operation S1510, it is determined whether a slope $FD_y/FD_x$ of a straight line connecting the two adjacent coordinates $P_{t-1}(X_{t-1}, Y_{t-1})$ and $P_t(X_t, Y_t)$ on the curve is less than 1. If the slope $FD_y/FD_x$ of the straight line is less than 1, the crack checking unit 530 (630) continues in operation S1520. Otherwise, the crack checking unit 530 (630) continues in operation S1530.

In operation S1520, it is determined whether a difference $|\text{Round}(X_t) - \text{Round}(X_{t-1})|$ between round function values for x-coordinate components of the two adjacent coordinates $P_{t-1}(X_{t-1}, Y_{t-1})$ and $P_t(X_t, Y_t)$ is greater than 1. If the difference $|\text{Round}(X_t) - \text{Round}(X_{t-1})|$ between the round function values for the x-coordinate components of the two adjacent coordinates $P_{t-1}(X_{t-1}, Y_{t-1})$ and $P_t(X_t, Y_t)$ is greater than 1, for example, when the difference $|Round(X_t)-Round(X_{t-1})|$ is 2, the crack checking unit 530 (630) continues in operation S1540. Otherwise, the crack checking unit 530 (630) continues in operation S1550.

In operation S1530, it is determined whether a difference $|Round(Y_t)-Round(Y_{t-1})|$ between round function values for y-coordinate components of the two adjacent coordinates $P_{t-1}(X_{t-1}, Y_{t-1})$ and $P_t(X_t, Y_t)$ is greater than 1. If the difference $|Round(Y_t)-Round(Y_{t-1})|$ between the round function values for the y-coordinate components of the two adjacent coordinates $P_{t-1}(X_{t-1}, Y_{t-1})$ and $P_t(X_t, Y_t)$ is greater than 1, for example, when the difference $|Round(X_t)-Round(X_{t-1})|$ is 2, the crack checking unit 530 (630) continues in operation S1540. Otherwise, the crack checking unit 530 (630) continues in operation S1550.

In operation S1540, it is determined that cracks have been generated.

In operation S1550, it is determined that no cracks have been generated, and crack processing is ended.

Referring again to FIGS. 5 and 6, the curve rendering apparatus further includes a crack removing unit 540 (640). When it is determined that the crack has been generated, the crack removing unit 540 (640) adds a pixel between a current pixel and an immediately previous pixel that are adjacent to the crack, and fills the crack by using a function of drawing a line connecting the adjacent two pixels adjacent to the crack, a function of marking a dot on the pixel between the two adjacent pixels, or a function of drawing a rectangle on the pixel between the two adjacent pixels.

When a crack is found, a crack removal operation is performed to remove the crack. That is, an appropriate pixel on the crack is determined, and rendering is performed thereon. In the examples described herein, a size of the crack is 1. The crack adjacent to the two pixels may be filled by using a line_to($P_0$, $P_2$) function of FIG. 16 or a set_pixel($P_1$) or rectangle($P_1$, $F_1$) function of FIG. 17. $P_0$ and $P_2$ represent coordinates of the two points adjacent to the crack, and $P_1$ represents coordinates of the crack.

Figure 16:
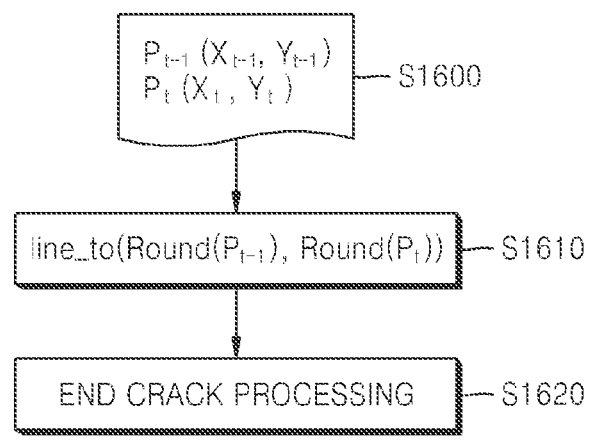
FIG. 16 is a flowchart illustrating an example of a process of removing a crack by using a line_to function of drawing a line between two pixels adjacent to the crack.

FIG. 16 is a flowchart illustrating an example of a process of removing a crack by using a line_to function of drawing a line between two pixels adjacent to the crack. Referring to FIG. 16, in operation S16000, two adjacent coordinates $P_{t-1}(X_{t-1}, Y_{t-1})$ and $P_t(X_t, Y_t)$ on a curve are input.

In operation S1610, the line_to(Round($P_{t-1}$), Round($P_t$)) function that draws line connecting the rounded two adjacent coordinates $P_{t-1}(X_{t-1}, Y_{t-1})$ and $P_t(X_t, Y_t)$ is executed. In operation S1620, crack processing is ended.

Figure 11:
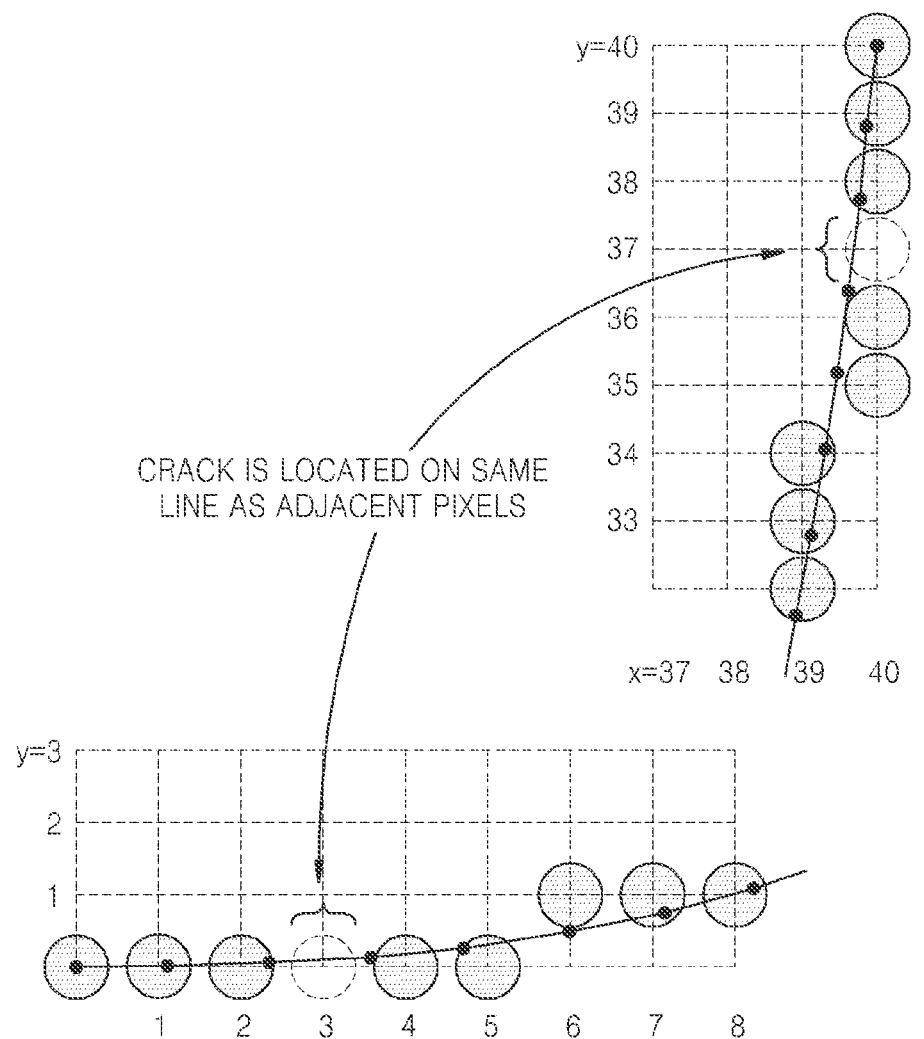
FIG. 11 is a diagram illustrating an example of a process of connecting two adjacent pixels with a straight line when cracks exist on the same horizontal or vertical line as adjacent pixels.

FIG. 11 is a diagram illustrating an example of a result of being recovered cracks of FIG. 10. Referring to FIG. 11, the crack existing between coordinates (2, 0) and (4, 0) and the crack existing between coordinates (40, 36) and (40, 38) are recovered.

Figure 17:
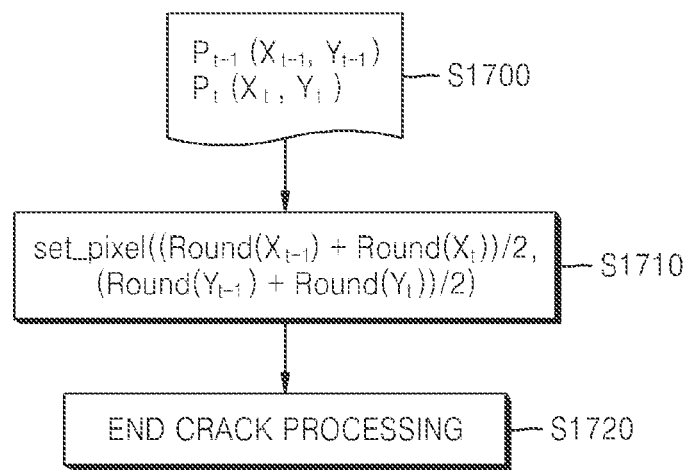
FIG. 17 is a flowchart illustrating an example of a process of removing a crack by using a set_pixel function of marking a dot on a pixel between two pixels adjacent to the crack.

FIG. 17 is a flowchart illustrating an example of a process of removing a crack by using a set_pixel function of marking a dot on a pixel between two pixels adjacent to the crack. In operation S1700, two adjacent coordinates $P_{t-1}(X_{t-1}, Y_{t-1})$ and $P_t(X_t, Y_t)$ on a curve are input.

In operation S1710, a set_pixel ((Round($X_{t-1}$)+Round($X_t$))/2, (Round($Y_{t-1}$)+Round($Y_t$))/2) function is executed to mark a dot between the two adjacent coordinates $P_{t-1}(X_{t-1}, Y_{t-1})$ and $P_t(X_t, Y_t)$ (S1710). In operation S1720, crack processing is ended.

In the examples described herein, a crack may easily be processed without changing a step size, as opposed to a general method using an adaptive step size.

Referring again to FIGS. 5 and 6, the curve rendering apparatus further includes a curve monotonizing unit 500 (600). The curve monotonizing unit 500 (600) generates a monotonic curve.

FIG. 8 illustrates a curve and a straight line connecting a start point and an end point among control points of the curve. A monotonic curve illustrated in FIG. 8 satisfies condition 3 below.

$$1 < \text{curve's length}/\text{length}(P_0 P_0) < 2 \quad \text{(Condition 3)}$$

From the condition 3, it can be seen that a length of the curve is greater than a length (Dist) of the straight line connecting the start point and the end point of the curve, and is less than twice the length (Dist) of the straight line. In other words, a number of pixels on the curve is larger than a number of pixels on the straight line (L) connecting the start point and the end point of the curve, and is smaller than twice the number of pixels on the straight line (L). That is, when the number of pixels corresponding to the length (Dist) of the straight line connecting the start point and the end point of the curve is set as the number of pixels on the curve, coordinates of a next point may be calculated such that no pixels are overlapped even though some cracks are generated.

Figure 9:
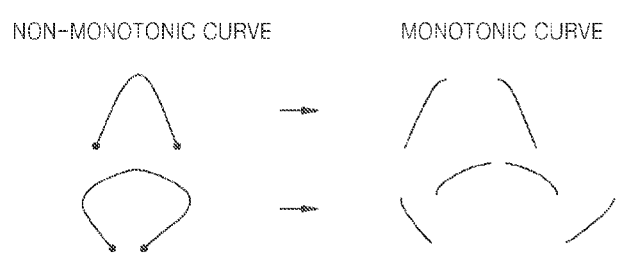
FIG. 9 is a diagram illustrating an example of a sub-division of a non-monotonic curve into monotonic curves.

However, not all curves satisfy the condition 3. FIG. 9 is a diagram illustrating a sub-division of a non-monotonic curve into monotonic curves.

In the example of the non-monotonic curve illustrated in FIG. 9, a length of the curve may be greater than twice a length (Dist) of a straight line connecting a start point and an end point of the curve. In this example, a curve monotonization is performed to sub-divide the non-monotonic curve into monotonic curves by using De Casteljau's algorithm, which is a curve decomposition algorithm.

Referring again to FIGS. 5 and 6, the curve monotonizing unit 500 (600) may include a control point converting unit 602, a peak point checking unit 604, and a curve decomposing unit 606. When the number of control points of a curve is four or more, the control point converting unit 602 converts the curve into a curve having three control points. The peak point checking unit 604 checks whether a peak point exists in the curve having three control points. When it is determined by the peak point checking unit 604 that the peak point exists in the curve having the three control points, the curve decomposing unit 606 decomposes the curve having the three control points into monotonic curves.

The process of decomposing the curve into the monotonic curves when it is determined that the peak point exists in the curve will be described below in detail. When the curve monotonization is performed, the curve may be sub-divided at coordinates of the peak point of the curve, as illustrated in FIG. 9. When the curve has the coordinates of the peak point, a t value is calculated. When the t value is in the range of about 0 to about 1, the corresponding curve is a monotonic curve. When the corresponding curve is not the monotonic curve, the curve may be sub-divided into two curves at a t position.

When the control points of the curve are $P_0(x_0, y_0)$, $P_1(x_1, y_1)$, and $P_2(x_2, y_2)$, the peak point checking unit 604 may calculate the t value as expressed in Equations 4 and 5.

$$t = T = (y_0 - y_1)/(y_0 - y_1 - y_1 + Y_2) \quad [\text{Equation 4}]$$

$$t = T = (x_0 - x_1)/(x_0 - x_1 - x_1 + x_2) \quad [\text{Equation 5}]$$

When the curve is directed in an upward or downward direction, the t value at the coordinates of the peak point may be calculated by using Equation 4. In addition, when the curve is directed in a left or right direction, the t value at the coordinates of the peak point may be calculated by using Equation 5.

When the calculated t value is not in the range of about 0 to about 1, the curve decomposing unit 606 may decompose the curve into two curves at the t position. That is, when the t value is calculated, the curve may be decomposed at the corresponding point by using De Casteljau's algorithm. At this time, the step calculating unit 510 (610) may calculate the NumStep value and the StepSize value by using the straight line connecting the start point and the end point from among the control points with respect to the monotonic curves.

Figure 7:
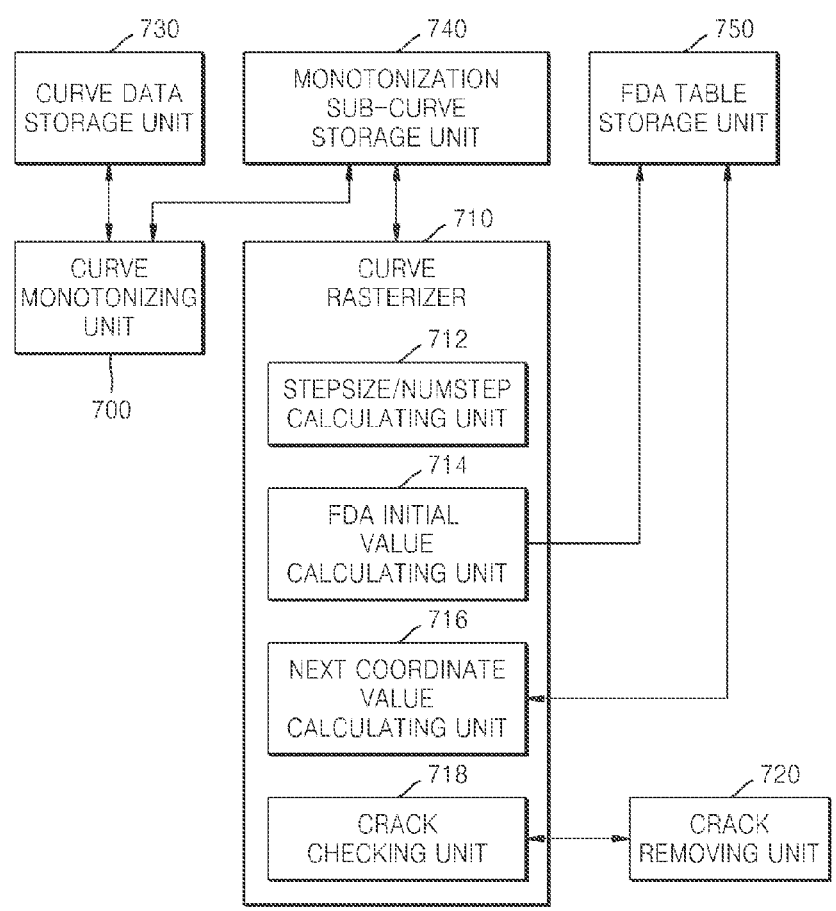
FIG. 7 is a block diagram illustrating still another example of a curve rendering apparatus.

FIG. 7 is a block diagram illustrating still another example of a curve rendering apparatus. The curve rendering apparatus includes a curve monotonizing unit 700, a curve rasterizer 710, a crack removing unit 720, a curve data storage unit 730, a monotonization sub-curve storage unit 740, and an FDA table storage unit 750. The curve rasterizer 710 includes a StepSize/NumStep calculating unit 712, an FDA initial value calculating unit 714, a next coordinate value calculating unit 716, and a crack checking unit 718.

Similar to the curve monotonizing units 500 and 600 of FIGS. 5 and 6, respectively, the curve monotonizing unit 700 generates a monotonic curve, reads curve data from the curve data storage unit 730, monotonizes a curve, and stores a result value in the monotonization sub-curve storage unit 740.

Similar to the step calculating units 510 and 610 of FIGS. 5 and 6, respectively, the StepSize/NumStep calculating unit 712 calculates a NumStep value and a StepSize value by using a length of a straight line connecting a start point and an end point among control points for curve rendering.

Similar to the initial value calculating unit 622 of FIG. 6, the FDA initial value calculating unit 714 calculates coefficient values of a curve equation, like Equation 1, by using the control points, and calculates FDA initial values by using the coefficient values and the StepSize value. The FDA initial value calculating unit 714 stores the FDA initial values in the FDA table storage unit 750.

The next coordinate value calculating unit 716 is a combination of the functions of the table generating unit 624 and the pixel coordinate value calculating unit 626 of FIG. 6. The next coordinate value calculating unit 716 generates an FDA table by using the FDA initial values, calculates a coordinate value of a pixel to be rendered based on the FDA table, stores a result value of the generating of the FDA table and/or the calculating of the coordinate value in the FDA table storage unit 750, and reads a needed coordinate value.

Similar to the crack checking units 530 and 630 of FIGS. 5 and 6, respectively, the crack checking unit 718 checks for a generation of cracks by comparing the calculated coordinate value of the pixel with a coordinate value of an immediately previous pixel. In addition, when a difference between round function values for coordinate component values of two coordinate values corresponding to two adjacent pixels is 2, the crack checking unit 718 determines that cracks have been generated.

For example, if a slope of a straight line connecting two adjacent coordinates on a curve is less than 1, it may be determined that cracks have been generated, when a difference between round function values for x-coordinate component values of the two coordinates is 2. On the other hand, if the slope of the straight line connecting two adjacent coordinates on the curve is greater than or equal to 1, it may be determined that cracks have been generated, when a difference between round function values for y-coordinate component values of the two coordinates is 2.

Similar to the crack removing units 540 and 640 of FIGS. 5 and 6, respectively, when it is checked that cracks have been generated, the crack removing unit 720 adds a pixel between a current pixel and an immediately previous pixel, and fills the crack by using a function of drawing a line connecting the two pixels adjacent to the crack, a function of marking a dot on the pixel between the two adjacent pixels, or a function of drawing a rectangle on the pixel between the two adjacent pixels.

Figure 12:
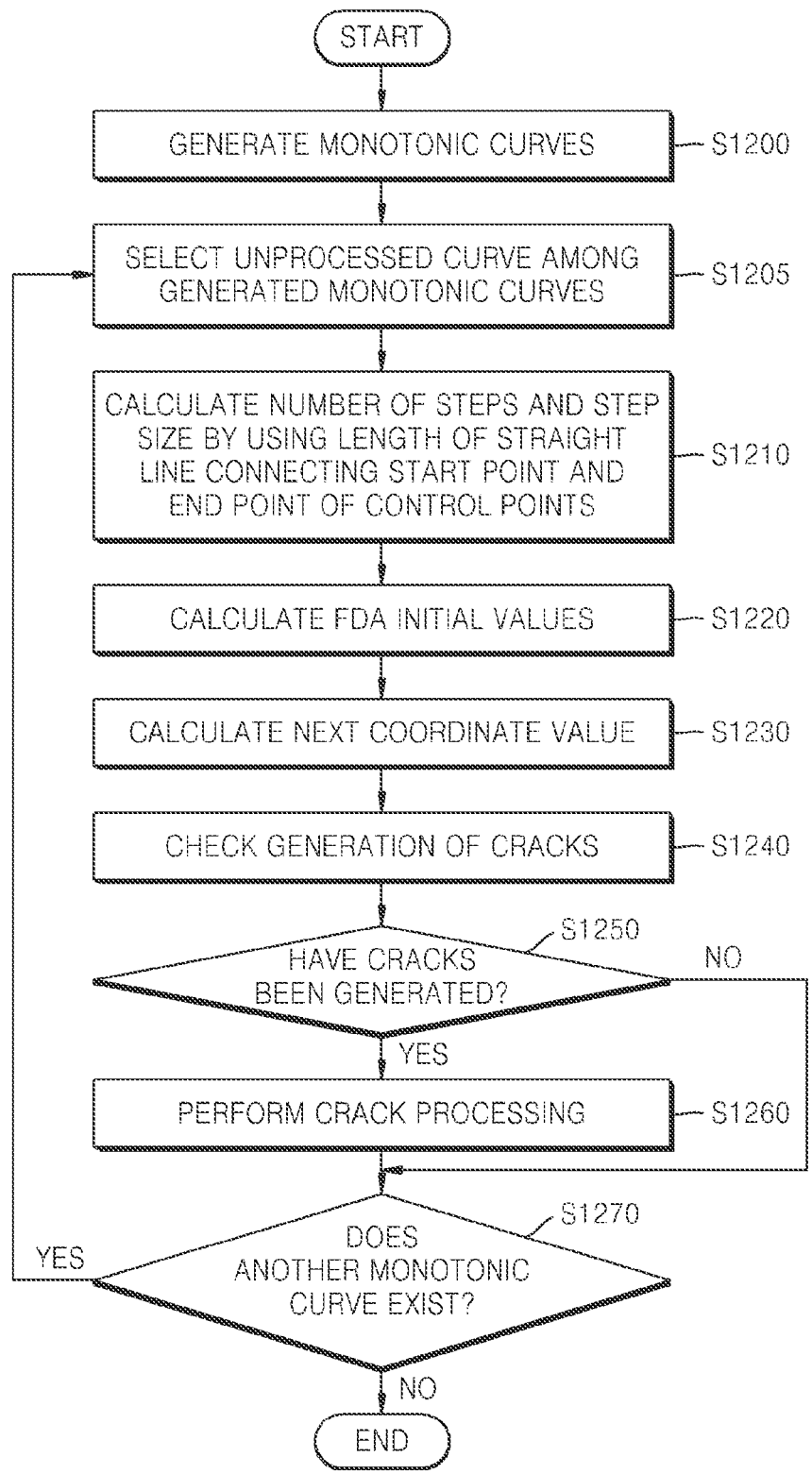
FIG. 12 is a flowchart illustrating an example of a curve rendering method.

FIG. 12 is a flowchart illustrating an example of a curve rendering method. In operation S1200, the curve rendering method includes reading curve data, checking whether the read curve data is monotonic data, and generating monotonic curves when a curve corresponding to the read curve data is not a monotonic curve.

In operation S1205, an unprocessed monotonic curve is selected among the generated monotonic curves.

In operation S1210, a number of steps and a step size for the monotonic curve are calculated by using a length of a straight line connecting a start point and an end point of control points for curve rendering.

In operation S1220, FDA initial values are calculated by using the calculated step size and coefficient values of a curve equation determined when the control points are given.

In operation S1230, an FDA table is generated by using the initial values, and a next coordinate value of a pixel is calculated based on the FDA table by an operation of adding the initial values. For example, the next coordinate value of the pixel may be calculated by an FDA. When the control points are input, coefficient values A, B, C, and D of the curve equation may be calculated by using control points P0, P1, P2, and P3, as expressed in Equation 1 above. The FDA initial values (t=0) may be calculated by using the coefficient values and the step size, as expressed in Equation 2 above. After t is increased by the step size, the FDA table may be generated by using the initial values and Equation 3 above, as illustrated in FIGS. 3A and 3B. The next coordinate value of the pixel may be calculated based on the FDA table.

In operation S1240, a generation of cracks is checked by comparing the calculated next coordinate value of the pixel with a coordinate value of an immediately previous pixel. When a difference between round function values for coordinate component values of two coordinates corresponding to two adjacent pixels is 2, it may be determined that cracks have been generated.

In operation S1250, it is determined whether cracks have been generated. When cracks have been determined to be generated, the method continues in operation S1260. Otherwise, the method continues in operation S1270.

In operation S1260, crack processing is performed by adding a pixel between a current pixel and an immediately previous pixel. That is, the crack processing or removal may be performed by filling the cracks by using a function of drawing a line connecting two pixels adjacent to a crack, a function of marking a dot on the pixel between the two adjacent pixels, or a function of drawing a rectangle on the pixel between the two adjacent pixels. The function of drawing the rectangle may mark dots when two diagonal points of four vertexes are set as the same point.

In operation S1270, it is determined whether another monotonic curve exists. When another monotonic curve is determined to exist, the method returns to operation S1200. Otherwise, the curve rendering method ends.

Figure 13:
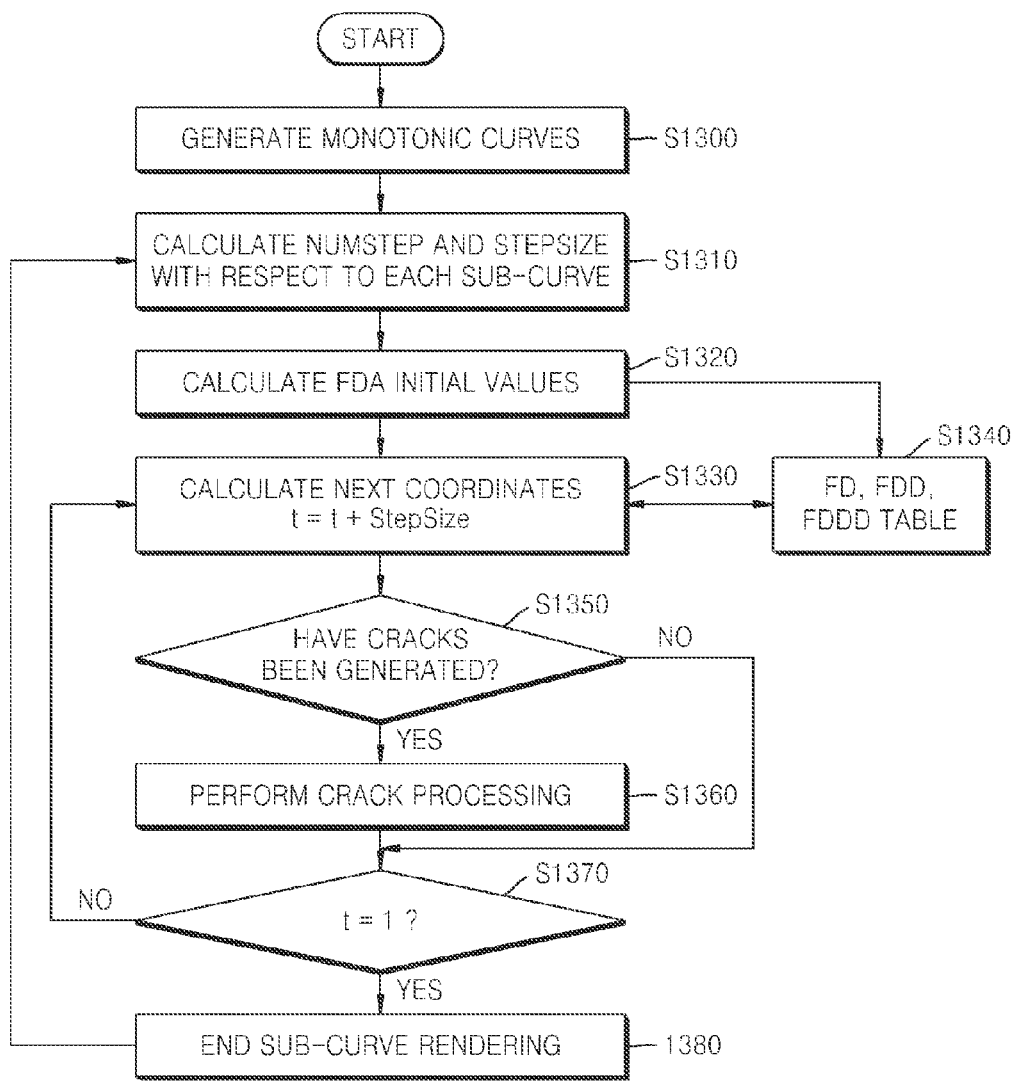
FIG. 13 is a flowchart illustrating another example of a curve rendering method.

FIG. 13 is a flowchart illustrating another example of a curve rendering method. In operation S1300, the curve rendering method includes reading curve data, checking whether the read curve data is monotonic data, and generating a monotonic curve when a curve corresponding to the curve data is not a monotonic curve.

In the generating of the monotonic curve, when the curve has four or more control points, the corresponding curve is converted into a curve having three control points, and it is checked whether a peak point exists in the curve having the three control points. When the peak point exists in the curve having the three control points, the corresponding curve is decomposed into monotonic curves.

In the checking of whether the peak point exists in the curve, when the control points of the curve are $P_0(x_0, y_0)$, $P_1(x_1, y_1)$ and $P_2(x_2, y_2)$, a t value may be calculated by using Equations 4 and 5. When the curve is directed in an upward or downward direction, the t value at coordinates of the peak point may be calculated by using Equation 4. When the curve is directed in a left or right direction, the t value at the coordinates of the peak point may be calculated by using Equation 5. When the t values calculated in Equations 4 and 5 are not in a range of about 0 to about 1, the corresponding curve is decomposed into two monotonic sub-curves at a t position.

In operation S1310, a NumStep value and a StepSize value with respect to each of the monotonic sub-curves is calculated by using a length of a straight line connecting a start point and an end point among the control points for curve rendering, which was described in detail in FIG. 14.

In operation S1320, FDA initial values are calculated by using the calculated StepSize value and coefficient values A, B, C, and D of the curve equation, which is determined as expressed in Equation 1 above when the control points are given.

In operations S1330 and S1340, an FDA table, as illustrated in FIGS. 3A and 3B, is generated by using the initial values, and next coordinate values of pixels are calculated based on the FDA table by an operation of adding the initial values.

In detail, in operation S1330, the coordinate values of the pixels are calculated by an FDA. When the control points are input, the coefficient values A, B, C, and D of the curve equation are calculated by using the control points P0, P1, P2, and P3, with reference to Equation 1 above. The FDA initial values (t=0) are calculated by using the coefficient values and the step size, as expressed in Equation 2 above. In operation S1340, after t is increased by the step size, the FDA table is generated by using the initial values and Equation 3 above, as illustrated in FIGS. 3A and 3B. In operation S1330, the coordinate values of the pixels are calculated based on FDA table.

In operation S1350, a generation of cracks is checked by comparing each of the calculated coordinate values of the pixels with a coordinate value of an immediately previous pixel. That is, it is determined whether cracks have been generated. When a difference between round function values for coordinate component values of two coordinates corresponding to two adjacent pixels is 2, it is determined that cracks have been generated. FIG. 15 is a flowchart illustrating an example of the crack checking in operation S1350. When the cracks have been determined to be generated, the method continues in operation S1360. Otherwise, the method continues in operation S1370.

In operation S1360, crack processing is performed by adding a pixel between a current pixel and an immediately previous pixel. The crack processing or removal may be performed by filling the cracks by using a function of drawing a line connecting two pixels adjacent to a crack, a function of marking a dot on the pixel between the two adjacent pixels, or a function of drawing a rectangle on the pixel between the two adjacent pixels. The function of drawing the rectangle may mark dots when two diagonal points of four vertexes are set as the same point.

In operation S1370, it is determined whether the t value is equal to 1. When the t value is determined to be equal to 1, the method continues in operation S1380. Otherwise, the method returns to operation S1330. That is, operations S1330 to S1360 are performed on coordinates corresponding to the number of steps, until the t value becomes 1.

In operation S1380, sub-curve rendering is ended, and the method returns to operation S1310. That is, operations S1310 to S1370 are performed on all sub-curves.

The examples of the curve rendering methods and apparatuses described may eliminate redundant rendering and cracks, which may occur during curve rendering, thus improving rendering quality and curve quality. As opposed to the AFDA that frequently changes a step size whenever cracks and redundant rendering occur in pixels during curve rendering, the step size change may be eliminated, crack processing may be simplified, and the curve rendering performance may be improved. The curve rendering methods and apparatuses may be applied to any type of 2D graphics rendering apparatuses, for example, mobile devices, note PCs, desktop computers, and servers.

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computer-implemented curve rendering method, the method comprising:

calculating, by a processor, a step size based on a length of a straight line connecting a start point and an end point among control points of a curve to be rendered;

calculating, by the processor, initial values of a forward differencing algorithm (FDA) based on the calculated step size and coefficient values of an equation of the curve to be rendered that is determined based on the control points;

generating, by the processor, an FDA table based on the initial values;

calculating, by the processor, a coordinate value of a current pixel based on the FDA table;

determining, by the processor, whether a crack has been generated by comparing the calculated coordinate value of the current pixel with a coordinate value of an immediately previous pixel, by determining that the crack has been generated in response to a slope of a straight line connecting two coordinate values corresponding to two adjacent pixels on the curve to be rendered being less than 1 and a determined difference between round function values for x-coordinate component values of the two coordinate values being 2, or determining that the crack has been generated in response to the slope of the straight line connecting the two coordinate values being greater than or equal to 1 and a determined difference between round function values for y-coordinate component values of the two coordinate values being 2; and rendering, by the processor, another pixel between the current pixel and the immediately previous pixel in response to the crack being determined to have been generated, displaying, by the processor, the curve to be rendered configured to the current pixel at the calculated coordinate value and the rendered other current pixel between the current pixel and the immediately previous pixel on a computer screen so that the crack is processed without changing the step size.

2. The curve rendering method of claim 1, wherein the determining of whether the crack has been generated comprises:
    determining that the crack has been generated in response to a determined difference between round function values for coordinate component values of two coordinate values corresponding to two adjacent pixels being 2.

3. The curve rendering method of claim 1, wherein the rendering of the other pixel comprises:
    filling the crack based on a function of drawing a line connecting two pixels adjacent to the crack, a function of marking a dot on a pixel between the two pixels adjacent to the crack, or a function of drawing a rectangle on a pixel between the two pixels adjacent to the crack.

4. The curve rendering method of claim 1, wherein the calculating of the step size comprises:
    calculating a number of steps based on the length of the straight line; and
    calculating the step size to be a reciprocal of the number of the steps.

5. The curve rendering method of claim 1, wherein the calculating of the initial values comprises:
    calculating the coefficient values based on the control points.

6. The curve rendering method of claim 1, further comprising:
    generating, by the processor, a monotonic curve to be the curve to be rendered.

7. The curve rendering method of claim 6, wherein the generating of the monotonic curve comprises:
    in response to the curve to be rendered having four or more control points, converting the curve to be rendered into a curve having three control points;
    determining whether a peak point exists in the curve having the three control points; and
    decomposing the curve having the three control points into monotonic curves in response to the peak point being determined to exist in the curve having the three control points.

8. The curve rendering method of claim 7, wherein:
    the control points of the curve having the three control points are $P_0(x_0, y_0)$, $P_1(x_1, y_1)$, and $P_2(x_2, y_2)$;
    the determining of whether the peak point exists in the curve having the three control points comprises
        in response to the curve having the three control points being directed in an upward or downward direction, calculating a t value at coordinates of the peak point based on the following equation $$t=T=(y_0-y_1)/(y_0-y_1-y_1+y_2), \text{ and}$$

in response to the curve having the three control points being directed in a left or right direction, calculating the t value at the coordinates of the peak point based on the following equation $$t=T=(x_0-x_1)/(x_0-x_1-x_1+x_2); \text{ and}$$

the decomposing of the curve having the three control points comprises decomposing the curve having the three control points into two curves at a t position in response to the calculated t value not being in a range of about 0 to about 1.

9. A non-transitory computer-readable storage medium storing instructions that, when executed by a processor, cause the processor to perform the method of claim 1.

10. A curve rendering apparatus comprising:
    at least one processor; and
    a computer screen,
    wherein the at least one processor comprises:
        a step calculating unit configured to calculate a step size based on a length of a straight line connecting a start point and an end point among control points of a curve to be rendered;
        a coordinate value calculating unit configured to
            calculate initial values of a forward differencing algorithm (FDA) based on the calculated step size and coefficient values of an equation of the curve to be rendered that is determined based on the control points,
            generate an FDA table based on the initial values, and
            calculate a coordinate value of a current pixel based on the FDA table;
        a crack checking unit configured to determine whether a crack has been generated by comparing the calculated coordinate value of the current pixel with a coordinate value of an immediately previous pixel, by determining that the crack has been generated in response to a slope of a straight line connecting two coordinate values corresponding to two adjacent pixels on the curve to be rendered being less than 1 and a determined difference between round function values for x-coordinate component values of the two coordinate values being 2, or determining that the crack has been generated in response to the slope of the straight line connecting the two coordinate values being greater than or equal to 1 and a determined difference between round function values for y-coordinate component values of the two coordinate values being 2; and
        a crack removing unit configured to render another pixel between the current pixel and an immediately previous pixel in response to the crack being determined to have been generated,
    wherein the computer screen is configured to display the curve to be rendered configured to the current pixel at the calculated coordinate value and the rendered another pixel between the current pixel and the immediately previous pixel so that the crack is processed without changing the step size.

11. The curve rendering apparatus of claim 10, wherein the crack checking unit is configured to:
    determine that the crack has been generated in response to a determined difference between round function values for coordinate component values of two coordinate values corresponding to two adjacent pixels being 2.

12. The curve rendering apparatus of claim 10, wherein the crack removing unit is configured to:
    fill the crack based on a function of drawing a line connecting two pixels adjacent to the crack, a function of marking a dot on a pixel between the two pixels adjacent to the crack, or a function of drawing a rectangle on a pixel between the two pixels adjacent to the crack.

13. The curve rendering apparatus of claim 10, wherein the step calculating unit comprises:
    a step number calculating unit configured to calculate a number of steps based on the length of the straight line; and a step size calculating unit configured to calculate the step size to be a reciprocal of the number of the steps.

14. The curve rendering apparatus of claim 10, wherein the coordinate value calculating unit comprises:
an initial value calculating unit configured to calculate the coefficient values based on the control points.

15. The curve rendering apparatus of claim 10, further comprising:
a curve monotonizing unit configured to generate a monotonic curve to be the curve to be rendered.

16. The curve rendering apparatus of claim 15, wherein the curve monotonizing unit comprises:
a control point converting unit configured to, in response to the curve to be rendered having four or more control points, convert the curve to be rendered into a curve having three control points;
a peak point checking unit configured to determine whether a peak point exists in the curve having the three control points; and
a curve decomposing unit configured to decompose the curve having three control points into monotonic curves in response to the peak point being determined to exist in the curve having the three control points.

17. The curve rendering apparatus of claim 16, wherein:
the control points of the curve having the three control points are $P_0(x_0, y_0)$, $P_1(x_1, y_1)$, and $P_2(x_2, y_2)$;
in response to the curve having the three control points being directed in an upward or downward direction, the peak point checking unit is configured to calculate a t value at coordinates of the peak point based on the following equation $$t=T=(y_0-y_1)/(y_0-y_1-y_1+y_2);$$

in response to the curve having the three control points being directed in a left or right direction, the peak point checking unit is configured to calculate the t value at the coordinates of the peak point based on the following equation $$t=T=(x_0-x_1)/(x_0-x_1-x_1+x_2);\text{ and}$$

the curve decomposing unit is configured to decompose the curve having the three control points into two curves at a t position in response to the calculated t value not being in a range of about 0 to about 1.

18. A curve rendering apparatus comprising:
at least one processor; and
a computer screen,
wherein the processor comprises:
a step calculating unit configured to calculate a step size based on a length of a straight line connecting a start point and an end point among control points of a curve to be rendered;
a coordinate value calculating unit configured to calculate coordinate values of pixels based on the calculated step size;
a crack checking unit configured to determine whether a crack has been generated based on a calculated coordinate value, of the calculated coordinate values, of a current pixel by determining that the crack has been generated in response to a determined slope of a straight line connecting two coordinate values corresponding to the calculated coordinate value of the current pixel and a coordinate value of an adjacent pixel being less than 1 and a determined difference between round function values for x-coordinate component values of the two coordinate values being 2, or by determining that the crack has been generated in response to a determined slope of a straight line connecting two coordinate values corresponding to the calculated coordinate value of the current pixel and a coordinate value of an adjacent pixel being greater than or equal to 1 and a determined difference between round function values for x-coordinate component values of the two coordinate values being 2; and
a crack removing unit configured to render, in response to the crack being determined to have been generated, another pixel near the calculated coordinate value without changing the step size,
wherein the computer screen configured to display the curve to be rendered configured to the current pixel at the calculated coordinate value and the rendered other pixel between the current pixel and the immediately previous pixel so that the crack is processed without changing the step size.

19. The curve rendering apparatus of claim 18, wherein the step calculating unit comprises:
a step number calculating unit configured to calculate a number of steps based on the length of the straight line; and
a step size calculating unit configured to calculate the step size to be a reciprocal of the number of the steps.

20. The curve rendering apparatus of claim 18, wherein the coordinate value calculating unit comprises:
an initial value calculating unit configured to
calculate coefficient values of an equation of the curve to be rendered based on the control points, and
calculate initial values of a forward differencing algorithm (FDA) based on the calculated step size and the calculated coefficient values;
a table generating unit configured to generate an FDA table based on the initial values; and
a pixel coordinate value calculating unit configured to calculate the coordinate values of the pixels based on the FDA table by an adding of the initial values.

21. The curve rendering apparatus of claim 18, wherein the crack checking unit is configured to:
determine that the crack has been generated in response to a determined difference between round function values of the calculated coordinate value of the current pixel and a coordinate value of a select near pixel being 2.

22. The curve rendering apparatus of claim 18, wherein the calculating of the step size is performed to prevent redundancies in rendered pixels for the curve to be rendered.

* * * * *